Patented Apr. 29, 1952

2,594,355

UNITED STATES PATENT OFFICE 2,594,355

PRODUCTION OF HYDROXYLATED ALIPHATIC COMPOUNDS INCLUDING HYDROXYLATED ALIPHATIC CARBOXYLIC ACIDS AND LACTONES THEREOF

Erwin Schwenk, Montclair, N. J., and Domenick Papa, Brooklyn, N. Y., assignors to Schering Corporation, Bloomfield, N. J., a corporation of New Jersey No Drawing. Application April 28, 1947, Serial No. 744,517

8 Claims. (Cl. 260—344)

The present invention relates to the manufacture of carbon compounds with lengthened aliphatic chain and more particularly to the production of hydroxy carboxylic and dicarboxylic acids and their lactones and likewise of keto carboxylic acids, and especially of compounds having heterocyclic or alicyclic rings containing a large number of carbon atoms.

More specifically, the invention relates to an improved process for effecting rupture of the ring of substituted furan compounds, whereby the carbons of such ring are made to form part of an aliphatic chain and higher aliphatic radicals thereby produced.

It is the general object of the invention to provide a simple and efficient process for the manufacture of compounds having higher aliphatic groups, and particularly of higher aliphatic dicarboxylic acids and hydroxy mono- and di-carboxylic acids and their cyclic keto and lactone derivatives, and interesterified hydroxy acids.

It is a further object of the invention to provide an improved process for lengthening an aliphatic chain by the addition thereto of a chain of a plurality of carbon atoms to which may be attached any substituent, like alkyl, aryl, aralkyl, hydroxyl, carboxyl, carboalkoxy and a variety of other groups whose nature is determined only by the availability of the starting compounds, whereby compounds valuable in themselves or as intermediates for the manufacture of other products are obtained.

In recent years the preparation of long chain dicarboxylic aliphatic acids has become of particular interest because of the relation of such substances to natural perfume ingredients and to substances of the general nature of muscone and civetone. For the preparation of these acids methods have become known which, however, usually comprise a large number of steps and give comparatively small yields.

Accordingly, it is a still further object of the invention to provide a simple and economical process for the preparation of long chain dicarboxylic aliphatic acids which are capable of conversion into compounds of muscone-like character suitable for use in perfumery.

Other objects and advantages of the invention will be apparent from the following more detailed description thereof.

We have found that α- and/or β-substituted furan compounds can be split open by reduction with the aid of a Raney alloy, preferably a Raney nickel-aluminum alloy, in aqueous alkali in such a manner that the carbons of the ring form an aliphatic chain to which may be terminally or otherwise joined a substituting group of the original furan compound. Thus, as we have found, the mono-carboxylic keto acids obtained by the Friedel-Crafts reaction between furan and its substitution products, with either the anhydrides or the half ester acid chlorides of dibasic acids can be reduced in alkaline solution with Raney nickel-aluminum alloy. During the course of the reduction the oxygen of the furan ring is converted to hydroxyl and becomes attached to one of the carbons of the split furan ring. In general, a portion of the furan compound will simultaneously be reduced to a tetrahydrofuran derivative. The hydroxy acids may be converted to the lactones some of which are useful in the perfume industry because of their muscone-like character.

We have found that the reduction of furan compounds with rupture of the ring readily takes place at temperatures not exceeding the boiling point of aqueous alkali solutions and, in general, proceeds smoothly at 50° C. No supply of molecular hydrogen is required for the reaction, which may be carried out at atmospheric pressure.

Thus, in the case of β-(α-furyl)acrylic acid (I), the following reactions occur upon treatment with nickel-aluminum alloy and aqueous alkali:

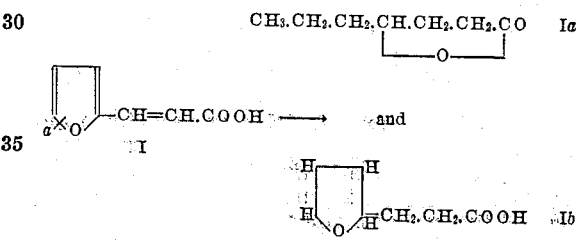

The broken line $a$ indicates the point of rupture.

If a mol of furoic acid ester, for example, the methyl, ethyl or benzyl ester, is combined with the acid ester chloride of adipic acid and the resulting compound reduced by the method of the invention, there are produced hydroxy dicarboxylic acids in accordance with the following reactions:

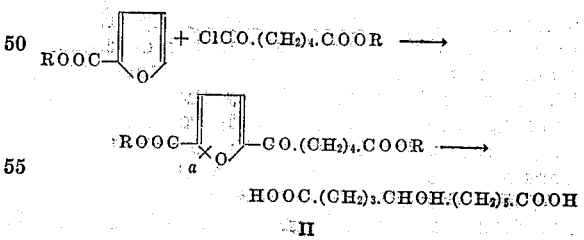

When 2 mols of furoic acid ester are condensed with one mol of adipyl chloride, the following product is formed:

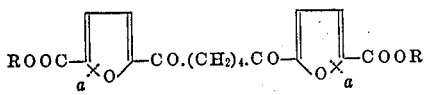

This compound on treatment with nickel-aluminum alloy undergoes rupture as indicated in the above formula, yielding:

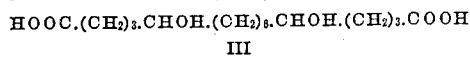

III

The hydroxy acids II and III can readily be converted into dicarboxylic acids by replacing the hydroxyl with a halogen atom and removing the hydroxyl by reduction.

The method of the invention is applicable to a wide range of substituted furan compounds. It is particularly useful in the treatment of compounds of the general formula

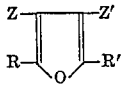

wherein Z and Z' represent hydrogen or a lower alkyl group, particularly methyl and ethyl, R represents hydrogen, a lower alkyl group up to and including $C_6H_{13}$, or a carboxylic group and R' represents —Y.COOH or —CO.Y'.COOH wherein Y and Y' are saturated or unsaturated aliphatic chains which may have aromatic, alicyclic or heterocyclic rings attached thereto.

For compounds of value in perfumery, the following formula represents a preferred group of starting compounds:

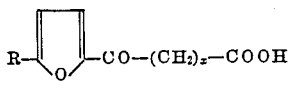

R being methyl or a higher alkyl group up to —$C_6H_{13}$, while $x$ is 8 to 10, although for other types of products it may be also 2 to 7 and 11 to 15. For preparing a compound having a pronounced musk-like odor, the following may be used:

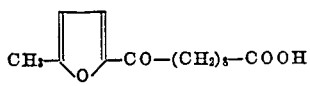

This starting compound yields, on reductive rupture of the ring, acidification and lactonization, an aliphatic lactone having 14 carbon atoms in the lactone ring, and a methyl group attached to one of the carbons, and which may be called a methyl-substituted exaltolid. In similar fashion, higher alkylated exaltolids may be obtained, and likewise alkylated lactones having 15 to 17 or more, or fewer than 14, carbon atoms. Another group of starting compounds is represented by the following:

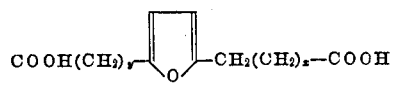

wherein $x$ and $y$ represent any appropriate integer except that the total number of carbon atoms in the whole compound does not exceed 22. The products obtained by the rupture of the ring will in all cases have hydroxyl and carboxyl groups, the latter in the terminal positions and the former at intermediate carbons.

While, theoretically, aliphatic acids having any desired reasonable number of carbon atoms in the aliphatic chain may be produced by suitably selecting the substituents, especially at the α-carbons, of the furan starting material, the ruptured ring providing a carbon chain joining such substituents, the compounds obtained in accordance with the invention and suitable for use in industry will have a maximum of about 22 carbon atoms.

While the preferred starting compounds are those having a carboxyl-containing (or neutralized carboxyl-containing) group attached to the ring, it is evident that our process is of more general nature and that the substituent may, for example, be purely hydrocarbon in nature.

The starting compounds required for the practice of the present invention are obtainable from natural sources or can be prepared by known methods, for example, via the Friedel-Crafts reaction with either the anhydrides or half ester acid halides, preferably chlorides, of dibasic organic acids, or the halides of monobasic organic acids. The resulting keto group which is formed in this reaction, as well as the ring double bonds, are reduced in the course of the ring rupture.

The four following examples illustrate some of the ways in which the starting compounds may be prepared:

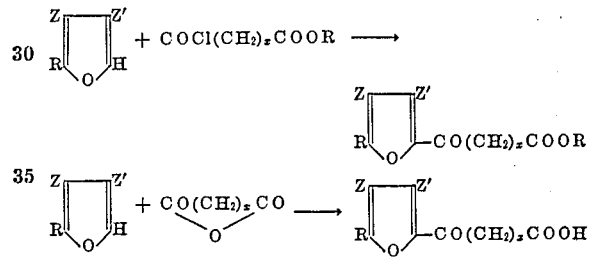

and

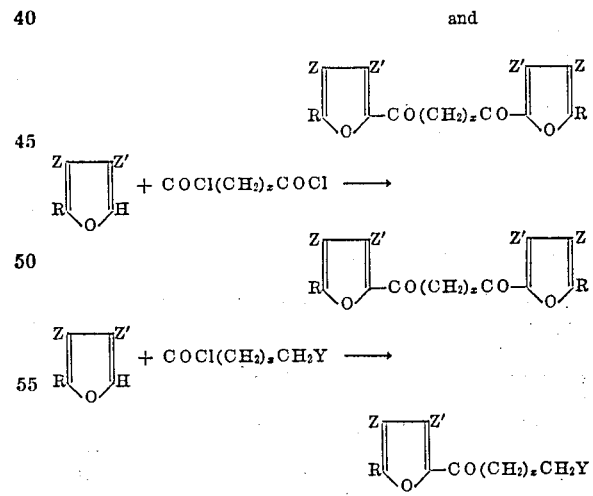

In the above formulae, $x$ has the meaning previously defined, while Y can be H, a group convertible into OH, or other suitable monovalent group.

As already indicated, where only a single substituent is attached to the furan ring, it may be located in either the α- or β-position; and a further substituent may be located at one of the other carbons of the ring. The substituents can each be purely aliphatic or they may consist of an aliphatic group attached at one end to the furan carbon and at its other end, or intermediately thereof, to an aromatic, hydroaromatic, alicyclic or heterocyclic group, for example, phenyl, cyclohexyl, furyl, furoyl, thenoyl, etc.

Olefinic double bonds in the side chain will generally be reduced during the course of the reaction.

The following examples are presented as illustrative of the invention, without, however, restricting the latter thereto.

*Example 1*

20 g. of furyl acrylic acid are dissolved in 1 liter of 10% sodium hydroxide. The mixture is then heated to about 50° C. and with stirring 50 g. of nickel-aluminum alloy is added in the course of 1½ to 2 hours. After the addition is complete the reaction mixture is heated for about a period of one hour, the original volume being maintained by the addition of water. The hot mixture is then filtered and the nickel washed twice with hot water. The combined filtrate and washings are acidified with concentrated HCl to Congo red paper. The acidified solution is then cooled and exhaustively extracted with ether. The ether solution is washed with 10% sodium chloride and then extracted cautiously with 5% sodium bicarbonate solution. The residual ether solution is then washed with water, dried and the ether evaporated. The residue on vacuum distillation yields 7.2 g. of γ-(n-propyl)butyrolactone, boiling at 103° C./10 mm. The sodium carbonate extracts are freed from ether and acidified with hydrochloric acid. On extraction with ether and evaporation of the ether, the residue is identified as β-(tetrahydrofuryl)propionic acid. It is obtained in a yield of 6.6 g., boiling at 113–114° C./1 mm.

*Example 2*

α-phenyl furyl acrylic acid is prepared by condensing anhydrous potassium phenyl acetate and freshly distilled furfural via the Perkin reaction. The acid is obtained in the usual manner and after recrystallization from acetone and water melts at 147–148° C.

25 g. of α-phenyl furyl acrylic acid is dissolved in 750 cc. of 10% sodium hydroxide and after heating to 50° C., 50 g. of Raney's nickel-aluminum alloy are added over a period of 2 hours. The addition of the alloy is made with stirring, and after the alloy is completely added, the reaction mixture is heated and stirred for an additional two hours. The alkaline solution is then filtered from the nickel residue and the filtrate poured into sufficient concentrated HCl to give an acid reaction to Congo red paper. The acidified solution, after cooling, is extracted several times with ether. The ether solution is washed with water and is then extracted with 5% sodium carbonate solution. The residual ether solution is washed with water and is then dried and evaporated. The residue on vacuum distillation yields 13 g. of α-phenyl-γ-n-proyl butyrolactone boiling at 145–147° C./1 mm. The sodium carbonate extracts are extracted once with ether, the ether discarded, and the alkaline solution made acid with concentrated HCl. The acid solution is then extracted with ether, the ether solution dried, evaporated, and the residue vacuum distilled. There are obtained 8 g. of α-phenyl-β-(tetrahydrofuryl)propionic acid boiling at 175–177° C./1 mm. The ethyl ester of this compound, prepared in the usual manner, boils at 135° C./1 mm. $n_D^{20}=1.5061$.

*Example 3*

α-(Δ¹-cyclohexenyl)furyl acrylic acid is prepared by the Perkin condensation of furfural and cyclohexenyl acetic acid, cyclohexylidene acetic acid or cyclohexenol-1 acetic acid, as described in our co-pending application Serial No. 725,266, filed January 3, 1947, now U. S. Patent 2,469,415, issued May 10, 1949.

For example, a mixture of 0.1 mol of cyclohexanol-1-acetic acid, 0.1 mol of furfural, 0.3 mol of triethylamine and 100 cc. of acetic anhydride is heated with stirring for 50–60 hours at 105–110° C. The reaction mixture is then poured into water to decompose the excess acetic anhydride. The crude condensation product is then extracted with ether and the ether extracts extracted with sodium carbonate solution. Upon acidification of the sodium carbonate extracts, the substituted acrylic acid is obtained.

Twenty-five grams of the substituted acrylic acid are reduced in accordance with the directions given for the corresponding phenyl derivative. After working up the reduction product, there are obtained approximately equal amounts of the α-cyclohexyl-β-(tetrahydrofuryl)propionic acid (IV), B. P. 170–172° C./2 mm. and α-cyclohexyl-γ-n-propyl butyrolactone (V), B. P.=130° C./3 mm.

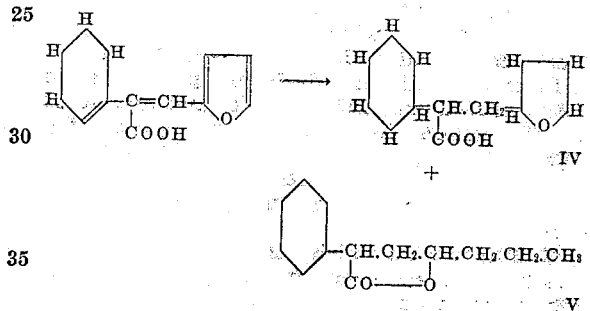

While the term "Raney alloy" is sometimes regarded as referring only to a nickel-aluminum alloy, and even to such an alloy of specific composition, the alloys useful in the present process may be of quite varied composition, but have in common the presence of a catalytically acting metal which is particularly active in the form of a skeleton catalyst, and likewise the presence of a metal which will liberate hydrogen in alkaline solution, which the first metal will not ordinarily do. One may use pre-formed Raney nickel catalyst and a hydrogen-generating metal such as aluminum or magnesium. For example, to the compound to be reduced in alkaline solution, there is added the pre-formed Raney nickel catalyst and after heating to the desired temperature, aluminum turnings are added in small portions. Instead of nickel other skeleton metal hydrogenation catalysts, such as copper or manganese, may be used. The term "Raney alloy" as used herein accordingly includes not only nickel-aluminum alloys, but also other metallic compositions having similar properties, such as those disclosed in the patent to Raney No. 1,915,473; and we shall employ the expression "Raney alloy" herein to designate a metallic composition containing the catalytic metal and the hydrogen-generating metal just referred to.

This application is a continuation-in-part of our application Ser. No. 572,586, filed January 12, 1945, now abandoned.

We claim:

1. The process which comprises subjecting a substituted furan compound to the action of a Raney alloy and an aqueous alkali solution at a temperature not exceeding the boiling point of the alkali solution whereby the furan ring is ruptured and recovering the compound containing a hydroxylated aliphatic chain thereby produced.

2. The process which comprises subjecting a substituted furan compound to the action of a nickel-aluminum Raney alloy and an aqueous alkali solution at a temperature not exceeding the boiling point of the alkali solution whereby the furan ring is ruptured and recovering the compound containing a hydroxylated aliphatic chain thereby produced.

3. The process which comprises subjecting a substituted furan compound to the action of a nickel-aluminum Raney alloy and an aqueous alkali solution at a temperature of about 50 C. whereby the furan ring is ruptured and recovering the compound containing a hydroxylated aliphatic chain thereby produced.

4. The process which comprises subjecting a furan compound having in the α-position a substituent containing a carboxyl group to the action of a Raney alloy and an aqueous alkali solution at a temperature not exceeding the boiling point of the alkali solution whereby the furan ring is ruptured and recovering the hydroxy carboxylic acid compound thereby produced.

5. The process which comprises subjecting a furan compound having in the α-position a substituent containing a carboxyl group to the action of a nickel-aluminum Raney alloy and an aqueous alkali solution at a temperature not exceeding the boiling point of the alkali solution whereby the furan ring is ruptured and recovering the hydroxy carboxylic acid compound thereby produced.

6. The process which comprises subjecting a substituted furan compound in an alkaline solution to the action of hydrogen developed in such solution by the action of a metal and activated by the presence of a Raney skeleton metal hydrogenation catalyst whereby the furan ring is ruptured and recovering the compound containing a hydroxylated aliphatic chain thereby produced.

7. The process which comprises subjecting a substituted furan compound in an alkaline solution to the action of hydrogen developed in such solution by the action of aluminum and activated by the presence of a nickel catalyst whereby the furan ring is ruptured and recovering the compound containing a hydroxylated aliphatic chain thereby produced.

8. The process which comprises subjecting a furyl acrylic acid of the formula

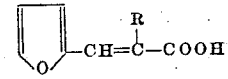

wherein R is selected from the group consisting of hydrogen and six-membered carbocyclic groups to the action of a Raney alloy and an aqueous alkali solution at a temperature not exceeding the boiling point of the solution whereby the furan ring is ruptured and recovering the lactone of the formula

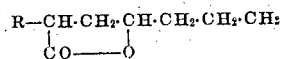

thereby produced.

ERWIN SCHWENK.
DOMENICK PAPA.

REFERENCES CITED

The following references are of record in the file of this patent:

UNITED STATES PATENTS

| Number | Name | Date |
|---|---|---|
| 2,364,358 | Hasche et al. | Dec. 5, 1944 |
| 2,368,366 | Kyrides et al. | Jan. 30, 1945 |
| 2,429,575 | Appleby et al. | Oct. 21, 1947 |
| 2,484,499 | Hagemeyer | Oct. 11, 1949 |

OTHER REFERENCES

Kaufmann et al., J. Am. Chem. Soc., V. 45, 1923, pp. 3030 and 3042.
Burdick et al., J. Am. Chem. Soc., vol. 56, Feb. 1934, page 439.
Lutz, J. Am. Chem. Soc. 63, 3192 (1941).